July 6, 1926. 1,591,098
J. S. ORR
PROPELLING DEVICE
Filed Oct. 7, 1925 2 Sheets-Sheet 1
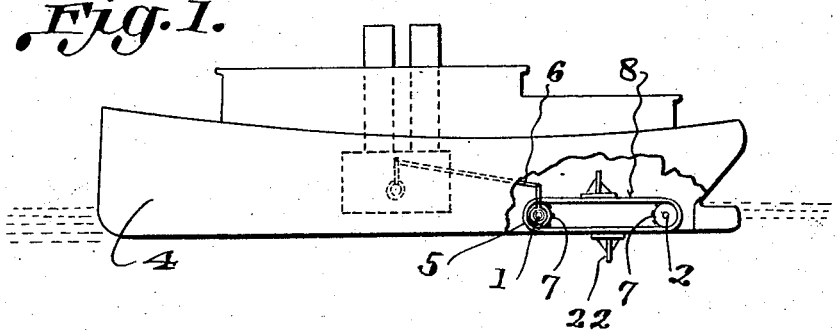
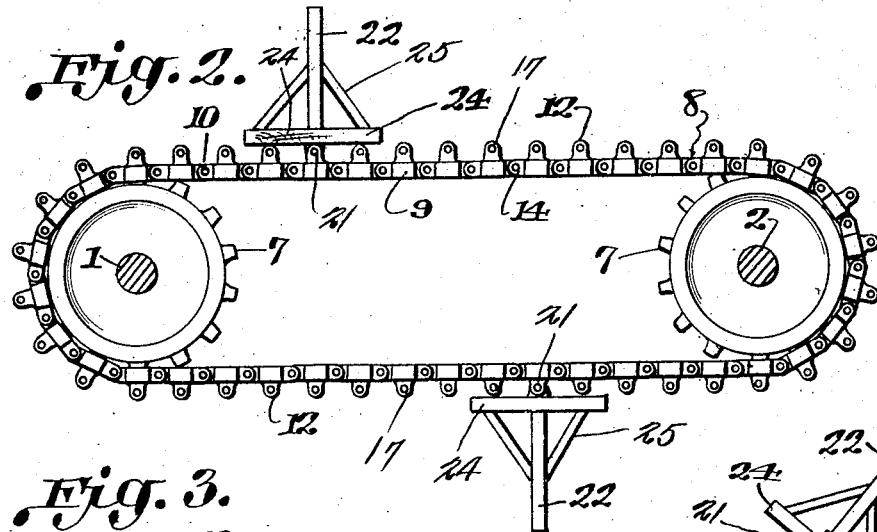
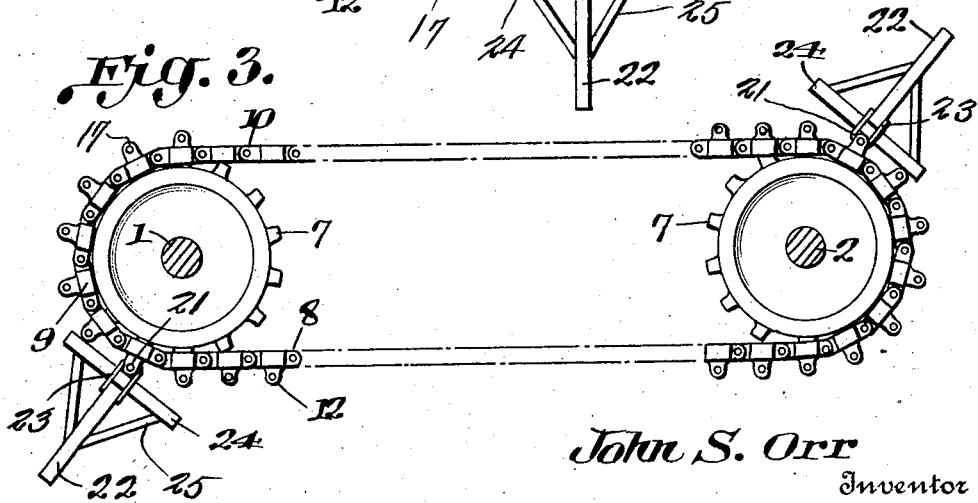
John S. Orr
Inventor July 6, 1926.
J. S. ORR
1,591,098
PROPELLING DEVICE
Filed Oct. 7, 1925    2 Sheets-Sheet 2
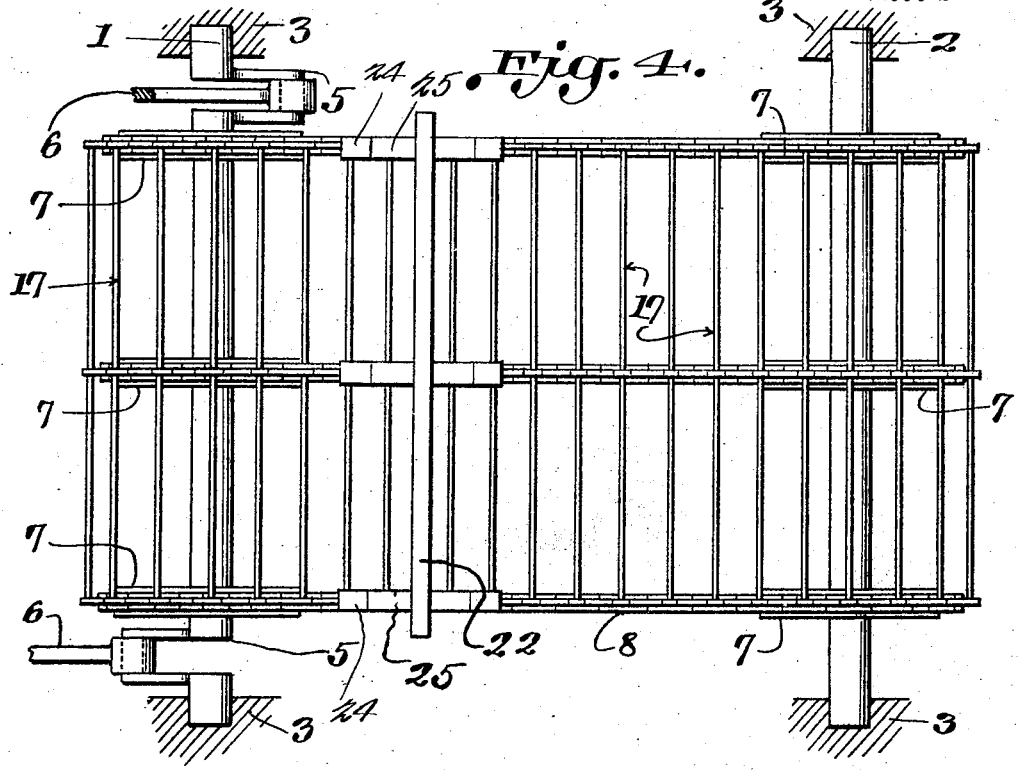
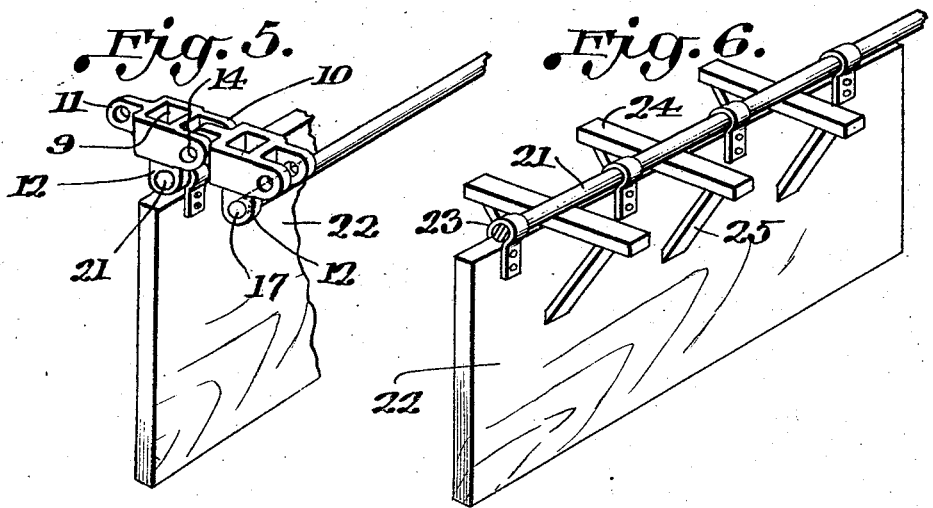
John S. Orr
Inventor Patented July 6, 1926.

1,591,098

UNITED STATES PATENT OFFICE.

JOHN STEVENS ORR, OF AUGUSTA, KENTUCKY.

PROPELLING DEVICE.

Application filed October 7, 1925. Serial No. 61,074.

This invention aims to provide a novel means for propelling vessels, side wheels being dispensed with, and it being unnecessary to provide a multiplicity of blades, as is the case when an ordinary paddle wheel is used.

It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawings:—

Figure 1 shows in side elevation, one of the many ways whereby the device forming the subject matter of this application may be mounted on a vessel; Figure 2 is a sectional elevation showing the mechanism per se, one of the blades being in the position which it will assume whilst it is propelling the vessel, and the other of the blades being in an inoperative position; Figure 3 is a similar view showing the blades as they will appear when in an intermediate or tilting position; Figure 4 is a top plan; Figure 5 is a perspective view showing how the blades or buckets are carried by the conveyor chains; Figure 6 is a perspective view showing one of the buckets or blades and attendant parts.

The device embodies a shaft 1 and a shaft 2, disposed in parallel relation, and supported at 3, in any desired way, on a vessel 4 of any description. The device may be operated as preferred. In the present embodiment of the invention, the shaft 1 has cranks 5 connected by pitmans 6 with the engine of the vessel 4. To the shafts 1 and 2, end and intermediate sprocket wheels 7 are secured, the sprocket wheels carrying an endless conveyor 8 made up of chains, each chain including links, and each link comprising a cup-shaped body 9 adapted to receive a tooth of the sprocket wheel, the body 9 being supplied at one end with spaced ears 10, and being equipped at its opposite end with an ear 11. The body 9 has a projection 12 disposed at right angles to the ears 10 and 11. The ear 11 on one link is received between the ears 10 on an adjoining link, the said ears of adjoining links being connected by a pivot element 14.

In the projections 12 of the various links are mounted cross ties 17 and 21, such as rods, the rods extending entirely across the conveyor 8. The rods 17 and 21 are given different numerals, because those rods have different functions. Paddles 22 are provided, and, ordinarily, no more than two paddles are used. By means of hinge eyes 23, the paddles 22 are mounted hingedly on the rods 21. Transverse feet 24 are secured to the inner edges of the paddles 22 and are sustained from the paddles by braces 25. The feet 24 rest on certain of the rods 17 and hold the paddles 22 at right angles to the conveyor. When, however, the conveyor moves about the sprocket wheels 7, the paddles 22 can tilt or feather to some extent, the result being that the device will act primarily in propelling the vessel, and not in lifting a large amount of water needlessly and uselessly.

Attention is directed to the fact that the complicated paddle wheels in common use are dispensed with, and in their room is employed the simple and effective structure shown in the drawings. The crank connection shown at 5—6 is of peculiar utility in that it affords the most powerful and directing means of transferring force from the engine to the conveyor 8. The device is so constructed that but one of the paddles will be in the water at a time, and as one paddle enters the water, the other paddle is leaving the water. The purpose of the invention is to create the greatest water propelling force known to exist up to the present time, and to apply this force to all vessels of commerce. The force is applied to the water in a straight line parallel to the surface of the water, and the device, therefore, is highly efficient. The length of the conveyer and the number of paddles may vary, but the structure shown in the drawings carries out and embodies the invention in a sasisfactory way.

By reversing the engine on the vessel, the device will propel the vessel backwardly with the same power as it propels it forwardly. Although a specific form of paddle has been shown at 22, it will be understood that any suitable form of paddle may be employed, without departing from the spirit of the invention.

What is claimed is:—

In a device of the class described, a vessel, sprocket wheels mounted to rotate on the vessel, sprocket chains comprising links having cup-shaped bodies receiving the teeth of the sprocket wheels, the bodies having projections, paddles, means for mounting the paddles on the projections of some of the links of the chains for feathering movement, rods connecting the chains and mounted on the projections of the other links thereof, and transverse feet secured intermediate their ends to the inner edges of the paddles and engaging certain of the rods to hold the paddles approximately at right angles to the chains when the paddles are not in feathering position.

In testimony that I claim the foregoing as my own, I have hereto affixed my signature.

JOHN STEVENS ORR.